United States Patent [19]
Kazamoto et al.

[11] Patent Number: 5,494,171
[45] Date of Patent: Feb. 27, 1996

[54] METHOD AND APPARATUS FOR REMOVING FINE PARTICLES FROM SYNTHETIC RESIN PELLETS

[75] Inventors: Akira Kazamoto; Yoshiaki Oishi, both of Matsuyama, Japan

[73] Assignee: Teijin Chemicals Ltd., Tokyo, Japan

[21] Appl. No.: 215,643

[22] Filed: Mar. 22, 1994

[30] Foreign Application Priority Data

Mar. 23, 1993 [JP] Japan .................................. 5-063919

[51] Int. Cl.$^6$ .................................................. B03B 7/00
[52] U.S. Cl. .................. 209/12.2; 209/127.4; 209/139.1; 209/142; 209/149
[58] Field of Search .......................... 209/3, 12.2, 127.4, 209/139.1, 142, 149, 145, 138

[56] References Cited

U.S. PATENT DOCUMENTS

| | | |
|---|---|---|
| 3,341,009 | 9/1967 | Bennet et al. . |
| 3,441,131 | 4/1969 | Gebauer ........................... 209/3 |
| 4,299,693 | 11/1981 | Paulson . |
| 4,568,453 | 2/1986 | Lowe, Jr. ........................... 209/149 X |
| 4,631,124 | 12/1986 | Paulson . |
| 5,035,331 | 7/1991 | Paulson ........................... 209/3 |
| 5,289,921 | 3/1994 | Rodrigo et al. ........................... 209/3 |

FOREIGN PATENT DOCUMENTS

| | | |
|---|---|---|
| 3040996 | 9/1982 | Germany . |
| 953690 | 3/1964 | United Kingdom . |

*Primary Examiner*—David H. Bollinger
*Attorney, Agent, or Firm*—Sherman and Shalloway

[57] ABSTRACT

Fine particles which electrostatically adhere to synthetic resin pellets are separated from the pellets by bringing the pellets/fine particles mixture into contact with an ionized gas. The ionized gas eliminates the electrostatic adhesion between the synthetic resin pellets and the fine particles. The resulting fine particles may thereafter be readily separated from the pellets and the freed fine particles may be withdrawn in a gas stream. Removal of the fine particles to less than 40 ppm is possible. Apparatus for carrying out the method is also described as is a system for stocking synthetic resin pellets using the described apparatus.

14 Claims, 1 Drawing Sheet

METHOD AND APPARATUS FOR REMOVING FINE PARTICLES FROM SYNTHETIC RESIN PELLETS

BACKGROUND OF THE INVENTION

1. Field of the Invention

This invention relates to a method for efficiently removing fine particles adhering to synthetic resin pellets by an electrostatic charge and an apparatus which can be used to practise the method. This invention further relates to a stock yard of a synthetic resin pellets.

2. Prior Art

In general, synthetic resin pellets carry fine particles which are generated during a step of producing the pellets or transportation of them. The presence of such fine particles causes a variety of troubles in a molding process with the use of the synthetic resin pellets, decreasing a commercial value of the synthetic resin pellets. Accordingly, the fine particles have to be removed as much as possible.

In recent years, synthetic resins, for example, polycarbonate resins have been used in an information recording substrate or all optical equipment such as optical lenses or the like. Since, in the optical usage, incorporation of a foreign matter has to be extremely excluded, the molding process of the optical equipment is generally carried out in a clean room. Accordingly, a permissible amount of the 16-mesh-pass fine particles carried with the polycarbonate resin pellets which are used in the optical equipment is considered to be 40 ppm or less.

Several methods for removing fine particles from synthetic resin pellets have been hitherto known. For example, there is a method in which fine particles are removed through a wire net by colliding synthetic resin pellets against the wire net through a high-speed air flow (15 m/second or more). Such method, however, causes a trouble that when the wire net is broken, a metal wire is incorporated into the synthetic resin pellets. When a punching metal is used instead of the wire net to avoid this trouble, problems such as crushing of the synthetic resin pellets tend to occur. There is also proposed a method in which fine particles are removed through a rotary drum covered with a wire net or a vibratory screen. In this method, high removal percentage of 9-mesh-pass and 16-mesh-on fine particles can be gained. According to the present inventors' actual measurement, it was 80 to 90%. However, removal percentage of the 16-mesh-pass fine particles is insufficient, and the present inventors' actual measurement showed that it was 60 to 75%. Further, there is a method in which synthetic resin pellets are caused to fall on a top of a conical body, and when the synthetic resin pellets fall from the peripheral portion of the conical body, the fine particles are removed by a rising air flow, and a method in which synthetic resin pellets are caused to fall while successively colliding against wall surfaces of a tower which is bent in a zigzag configuration wherein the fine particles are removed by a rising air flow. However, in these methods as well, removal percentage of 16-mesh-pass fine particles is insufficient, and according to the present inventors' actual measurement, it was 70 to 80%.

U.S. Pat. No. 4,631,124 discloses the kinetic gravity deduster employing gravity to feed the dust and impurity laden particulate material through a linear kinetic energy cell, which cell generates an electric field to neutralize the electrostatic charges causing the dust to adhere to the particulate material.

However, the above patent neither describes nor suggests the present invention.

SUMMARY OF THE INVENTION

It is an object of this invention to provide a method for efficiently removing fine particles which are carried with synthetic resin pellets and contain a foreign matter therein.

A special object of this invention is to provide a method for efficiently removing fine particles carried with synthetic resin pellets, which method can always supply the synthetic resin pellets in which 16-mesh-pass fine particles are carried in an amount of 40 ppm or less and a foreign matter is contained in a small amount.

Another object of this invention is to provide an apparatus which can suitably be used in practicing the above method.

Further another object of this invention is to provide a stockyard for a synthetic rubber pellets, using the above apparatus.

In accordance with this invention, there is first provided a method for removing fine particles electrostatically adhering to synthetic resin pellets from a mixture of the synthetic resin pellets containing the fine particles, which comprises bringing the mixture into contact with a gas which has been subjected to ionization treatment to eliminate the electrostatic adhesion between the synthetic resin pellets and the fine particles, and separating the resulting fine particles in which said adhesion has been eliminated.

In accordance with this invention, there is second provided an apparatus for removing fine particles from a mixture of synthetic resin pellets containing the fine particles that electrostatically adhere to the synthetic resin pellets, which comprises:

(a) a synthetic resin falling path of a conduit-like structure which is bent in at least one position and has a section of an optional shape, (b)($b_1$) an inlet for feeding the mixture, said inlet being situated in an upper portion of the synthetic resin falling path, and ($b_2$) a gas exhaust port which is situated in the vicinity of the inlet, (c)($c_1$) an outlet for discharging the synthetic resin pellets, said outlet being situated in a lower portion of the synthetic resin falling path and ($c_2$) a port for blowing a non-ionized gas, said port being situated in the vicinity of the outlet, and (d) a plurality of openings for blowing a gas which has been subjected to ionization treatment, said openings being situated in the inner wall of the synthetic resin falling path.

In accordance with this invention, there is third provided an apparatus for removing fine particles from a mixture of the synthetic resin pellets containing the fine particles that electrostatically adhere to the synthetic resin pellets, which comprises a tower having (a')($a'_1$) an inlet for feeding the mixture, said inlet being situated in an upper portion of the tower, and ($a'_2$) a gas exhaust port which is situated in the vicinity of the inlet, (b')($b'_1$) an outlet for discharging the synthetic resin pellets, said outlet being situated in a lower portion of the tower, and ($b'_2$) a port for blowing a non-ionized gas, said port being situated in the vicinity of the outlet, (c') at least two baffles for forming a bent flow path of the synthetic resin pellets, said baffles being mounted within the tower, and (d') a plurality of openings for blowing a gas which has been subjected to ionization treatment, said openings being situated in the inner wall of the tower and having the blowing directions towards the falling flow path of the synthetic resin pellets.

In accordance with this invention, there is fourth provided a stockyard of synthetic resin pellets which comprises a bunker for accumulating a mixture of synthetic resin pellets containing fine particles, an apparatus A for preliminarily removing the fine particles easy to remove from said mixture, the apparatus B, secondly or thirdly provided by this invention, for removing the fine particles, an outlet, and an apparatus for collecting the fine particles, wherein the bunker and the apparatus A are connected via a pipe for conveying the mixture of synthetic resin pellets from the lower portion of the bunker to the apparatus A by a pressurized gas, the apparatuses A and B are connected via a pipe for conveying the mixture of the synthetic resin pellets from which the fine particles easy to remove have been preliminarily removed from the lower portion of the apparatus B and the outlet are connected via a pipe for conveying the synthetic resin pellets from which the fine particles have been removed from the lower portion of the apparatus B to the outlet by a pressurized gas, and the apparatus for collecting the fine particles is connected with the apparatus A and the apparatus B via a pipe for conveying the fine particles removed from the apparatus A and the apparatus B.

The aforesaid objects of this invention can be achieved by the above-described inventions.

This invention will be described in detail below, which will make clear the other objects, advantages and effects of this invention.

DETAILED DESCRIPTION OF THE INVENTION

Figure 1:
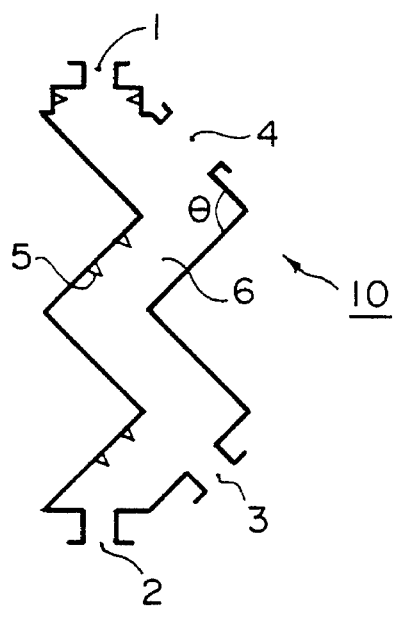
FIG. 1 is a schematic sectional view showing an embodiment of an apparatus provided by this invention.

The amount of fine particles contained in a mixture of synthetic resin pellets from which the fine particles are removed by the method of this invention is usually 100 to 500 ppm by weight based on the synthetic resin pellets. When the synthetic resin pellets contain a large amount of the fine particles, it is advisable to preliminarily remove said fine particles such that the amount thereof is rendered in the above range. The synthetic resin pellets here referred to have a short size of 1 to 3 mm and a long size of 1 to 8 mm. The fine particles here referred to are those passing the screen having 16 mesh size (JIS standard), and their shape is not limited in particular. Said fine particles are formed of the same resin as the synthetic resin pellets and of a foreign matter.

The synthetic resin is not limited in particular, examples thereof being a polycarbonate, a polyester, a polyolefin and a polyamide.

In the method of this invention, the mixture of the synthetic resin pellets containing the fine particles that adhere to the synthetic resin pellets by the electrostatic charge is brought into contact with the gas which is subjected to ionization treatment (hereinafter sometimes referred to as an "ionized gas"). This procedure can eliminate the adhesion by the electrostatic charge between the synthetic resin pellets and the fine particles.

Examples of the gas to be ionized include air, nitrogen gas and carbon dioxide gas. Such gases can be ionized by a device known per se, for example, a corona discharge-type ionizer.

When bringing the mixture of the synthetic resin pellets into contact with the ionized gas, it is possible to use the ionized gas alone. It is, however, also possible that a gas which is not subjected to ionization treatment (hereinafter sometimes referred to as a "non-ionized gas") is mixed with the ionized gas and the mixed gas is brought into contact with the mixture of the synthetic resin pellets, and this method is preferable.

The mixture of the synthetic resin pellets is brought into contact with the ionized gas, whereby the electrostatic adhesion is eliminated and the fine particles not adhering to the synthetic resin pellets are generated. The fine particles can be separated from the synthetic resin pellets by being conveyed with the gas.

The following method is an extremely desirable method in which the mixture of the synthetic resin pellets is countercurrently brought into contact with a mixed gas of an ionized gas and a non-ionized gas while moving the mixture of the synthetic resin pellets from the top to the bottom. As a non-ionized gas, air, nitrogen gas or carbon dioxide gas can be used.

In this method, elimination of the electrostatic adhesion between the synthetic resin pellets and the fine particles and separation of the synthetic resin pellets from the fine particles can be effectively carried out by the same operation. The fine particles are conveyed with the gas, withdrawn from the upper portion of the apparatus used, and recovered by a suitable means. The synthetic resin pellets from which the fine particles have been separated can be recovered from the lower portion of the apparatus.

The mixture of the synthetic resin pellets is brought into contact with the ionized gas usually under pressure of from atmospheric pressure to pressure to about 0.01 kg/cm.G at a temperature of from a room temperature to 150° C. The contacting conditions such as a degree of ionization of the ionized gas, an amount of the ionized gas, an amount of the non-ionized gas which is concurrently used with the ionized gas, a contact time and a flow rate of the gas vary with a type and a size of the apparatus used, a kind of the synthetic resin, an amount treated of the mixture of the synthetic resin pellets, and an amount and a size of the fine particles. These conditions can readily be determined by those skilled in the art through preliminary tests.

The amount of the ionized gas is preferably 240 to 300 liters/minute per kg/minute of the mixture of the synthetic resin pellets treated. The amount of the non-ionized gas is preferably 6,000 to 7,000 liters/minute on the same basis as above. A residence time of the synthetic resin pellets is preferably 2 to 5 seconds.

It is preferred that an amount of the mixture of the synthetic resin pellets supplied is controlled so that the synthetic resin pellets do not overlap each other in the path to allow a sufficient contact with ionized gas.

It is advisable that when the mixture of the synthetic resin pellets is moved from the top to the bottom, said mixture is bumped by colliding it against rigid barrier members. This method can remove the fine particles physically adhering to the synthetic resin pellets from said synthetic resin pellets. The thus removed fine particles are conveyed with the gas which countercurrently contacts said fine particles, and are separated from the synthetic resin pellets.

As a method for colliding the mixture of the synthetic resin pellets against the rigid barrier members, there can be mentioned a method in which a moving path of the mixture of the synthetic resin pellets is bent and a method in which a rotating blade that rotates at low speed is mounted within the moving path.

FIG. 1 is a schematic sectional view showing an embodiment of an apparatus which can be used in practicing the method of this invention.

In an apparatus 10 for removing fine particles as shown in FIG. 1, a mixture of synthetic resin pellets containing fine particles is fed from a feed inlet 1. An ionized gas is fed from openings 5 for blowing an ionized gas to a flow path 6 of a mixture of synthetic resin pellets. A non-ionized gas is fed from a port for blowing a non-ionized gas. The flow path 6 is a flow path of a conduit-like structure the cross-section of which is not particularly critical but is, preferably a rectangular shape and is bent in preferably 3 to 5 positions. A bending angle θ is preferably 80° to 100°. The mixture of the synthetic resin pellets is brought into contact with a mixed gas of the ionized gas and the non-ionized gas within the flow path 6, and the resulting fine particles are discharged with the gas through a gas exhaust port 4. Since the flow path 6 is bent, the mixture of the synthetic resin pellets violently collides against the wall of the flow path 6. As a result, the fine particles physically adhering to the synthetic resin pellets are separated from the synthetic resin pellets, conveyed with the gas and discharged from the gas exhaust port 4. The synthetic resin pellets from which the fine particles have been separated are recovered from an outlet 2 for discharging synthetic resin pellets.

To the openings for blowing the ionized gas is connected an ionizer (not shown) through which an ionization-treated gas is fed.

Figure 2:
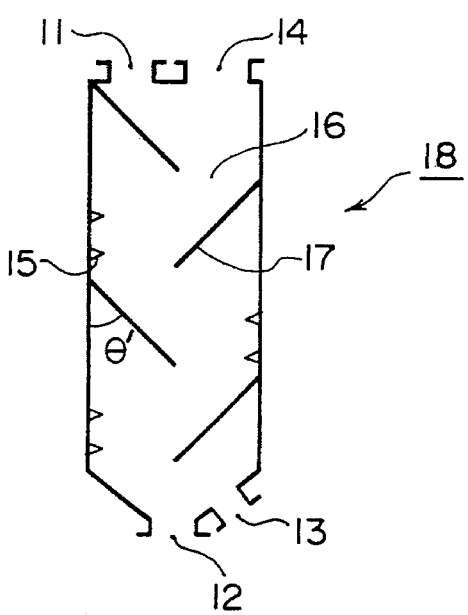
FIG. 2 is a schematic sectional view showing another embodiment of an apparatus provided by this invention.

FIG. 2 is a schematic sectional view showing another embodiment of an apparatus which can be used in practicing the method of this invention.

In an apparatus 18 for removing fine particles as shown in FIG. 2, the mixture of the synthetic resin pellets is fed from a feed inlet 11 provided in an upper portion of a tower. The ionized gas is blown from openings 15 for blowing an ionized gas, which are formed in the inner wall of the tower, into a flow path 16 of the mixture of the synthetic resin pellets which flow path is formed by four baffles 17. The non-ionized gas is fed from a port 13 for blowing a non-ionized gas. The mixture of the synthetic resin pellets flows from the top to the bottom along the flow path 16 formed preferably by 3 to 10 baffles 17. The mixture of the synthetic resin pellets is brought into contact with the mixed gas of the ionized gas and the non-ionized gas within the flow path 16, and the resulting fine particles are discharged from a gas exhaust port 14 along with the gas. Since the flow path 16 is bent by the baffles 17, the mixture of the synthetic resin pellets violently collides against the baffles 17. Consequently, the fine particles physically adhering to the synthetic resin pellets are separated from the synthetic resin pellets, conveyed with the gas and discharged from the gas exhaust port 14. The synthetic resin pellets from which the fine particles have been separated are recovered from an outlet 12 for discharging synthetic resin pellets. To the openings for blowing the ionized gas is connected an ionizer (not shown) as is the case with FIG. 1.

In the apparatus of the above embodiment, the number of the openings 15 for blowing the ionized gas is preferably 8 to 20. It is advisable that the openings 15 for blowing the ionized gas are formed both near a position which is a bit above the outlet 12 for discharging the synthetic resin pellets and near a position which is a bit above the mounting positions of the baffles.

At least two, preferably 3 to 10 baffles 17 are mounted on the inner wall of the tower. A plurality of the baffles are alternately opposite to one another with the difference in level. Said baffles are mounted obliquely downward, preferably such that an angle θ' with the wall of the tower is 40° to 50°.

Figure 3:
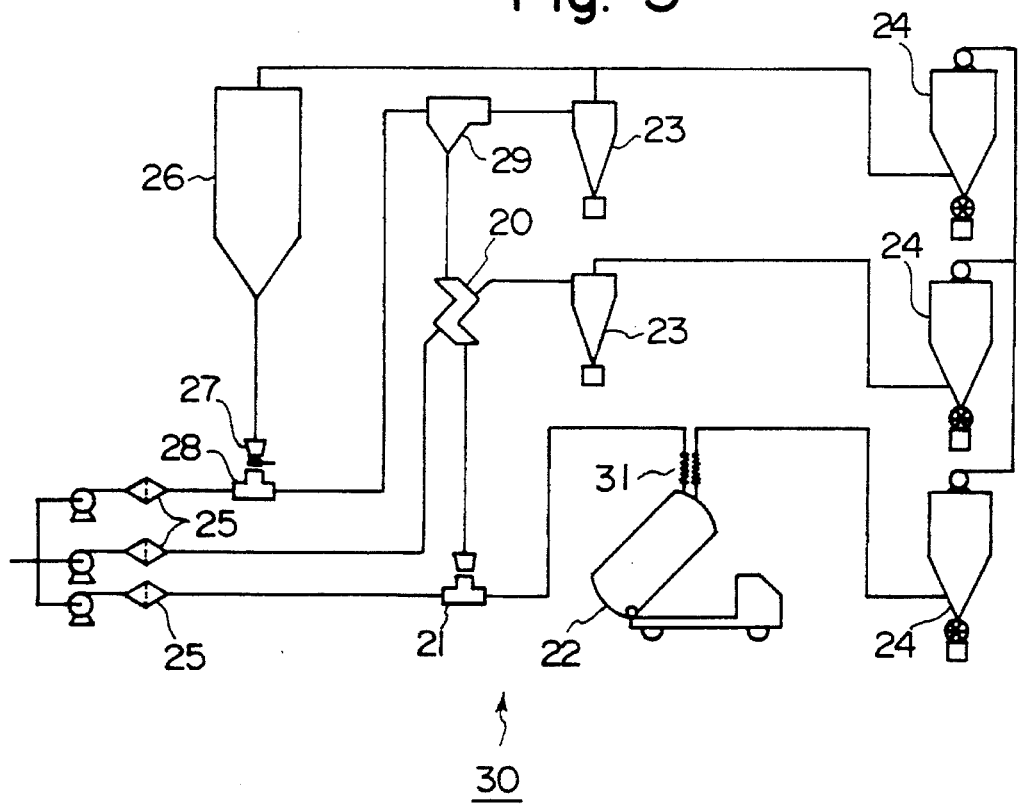
FIG. 3 is a flow chart showing an embodiment of a stock yard of synthetic resin pellets provided by this invention.

FIG. 3 is a flow chart schematically showing a stock yard of a synthetic resin which is equipped with the aforesaid apparatus used in practicing the method of this invention.

In FIG. 3, 26 is a bunker, 27 a valve, 28 a pressurized gas control valve, 29 an apparatus for removing fine particles, 20 an apparatus for removing fine particles which is equipped with an ionizer, 21 a pressurized gas control valve, 22 a container for transporting synthetic resin pellets, 23 a cyclone, 24 a bag filter and 25 a filter for cleaning a pressurized gas.

In the stock yard 30, when shipping the synthetic resin pellets received and accumulated in the bunker 26, the synthetic resin pellets are preliminarly fed to the first apparatus 29 for removing the fine particles with the pressurized gas which is controlled with the pressurized gas control valve 28 mounted below the bunker 26. In the first apparatus 29 for removing the fine particles, the fine particles which can readily be removed by separation among the fine particles entrained with the synthetic resin pellets are removed for reducing a load weight of the apparatus 20 for removing the fine particles provided by this invention, said apparatus being equipped with the ionizer. As the apparatus 29, any optional apparatus can be used. However, an apparatus for removing the fine particles using a punching metal is preferred from the aspect of preventing incorporation of the foreign matter.

The synthetic resin pellets from which most of the fine particles that are easy to remove by separation have been removed by the first apparatus 29 spontaneously fall and reach the apparatus 20 for removing the fine particles provided by this invention. The apparatus 20 is an apparatus for removing fine particles which is equipped with the aforesaid ionizer wherein the fine particles that are hard to remove by separation can sufficiently be removed as detailed above. The synthetic resin pellets from which the fine particles have been sufficiently removed are sent through an outlet 31 to the transporting container 22 with the pressurized gas which has been controlled with the pressurized gas control valve 21 mounted below the apparatus 10 for removing the fine particles. It is advisable that the pressurized gas used here is selected from air, nitrogen gas and carbon dioxide gas according to the purpose, and the gas is cleaned with the filter 25 for cleaning the pressurized gas from the standpoint of preventing incorporation of the foreign matter.

A route having the cyclone 23 and the bag filter 24 is used for collecting the fine particles which have been separated from the synthetic resin pellets.

This invention will be explained more specifically by referring to Examples.

EXAMPLE 1

An apparatus for removing fine particles as shown in FIG. 1 was used. The flow path of the mixture of the synthetic resin pellets in the apparatus was bent with an angle of about 90° in positions which divided the flow path into approximately three equal parts. Said flow path had a section of a rectangular shape 100 mm long and 150 mm wide. A height from a feed inlet 1 to a gas exhaust port 2 was 600 mm. Openings 5 for blowing an ionized gas which were connected to an ionizer (nozzle-type electrode NI-01 B model manufactured by Kasuga Denki K.K.) were provided in a total of ten positions, i.e., two positions in the vicinity of the feed inlet 1 of the mixture of the synthetic resin pellets, and eight positions on the way to the bottom. The non-ionized air was blown from a port 3 for blowing a non-ionized air at a rate of 6.7 $m^3$/minute, and 20 liters/minute of the ionized air were blown from each of the openings for blowing the ionized gas. From the feed inlet 1, cylindrical polycarbonate resin pellets (carrying 350 ppm of 16-mesh-pass fine particles) which had a viscosity-average molecular weight of 15,000 and were 3 mm in diameter and 3 mm in length, were charged at a rate of 32 kg/minute. The amount of the 16-mesh-pass fine particles carried with the pellets which were obtained from the outlet 2 was 15 to 35 ppm, and removal percentage of said fine particles was 90 to 96% by weight.

Comparative Example 1

Example 1 was repeated except that the ionized air was not blown for comparison. As a result, removal percentage was about 80% by weight.

According to this invention which has been thus far explained, the fine particles can efficiently be removed, and the synthetic resin pellets that contain 40 ppm or less of the 16-mesh-pass fine particles and a small amount of a foreign matter can be obtained. This invention can suitably be applied to the synthetic resin which is used in the optical usage.

What we claim is:

1. A method for removing fine particles electrostatically adhering to synthetic resin pellets from a particle mixture of synthetic resin pellets containing fine particles, said method comprising:

(a) subjecting a gas to an ionization treatment to obtain an ionized gas;

(b) contacting the mixture of the synthetic resin pellets containing the fine particles with the ionized gas to eliminate the electrostatic adhesion between the synthetic resin pellets and the fine particles to thereby obtain fine particles free from electrostatic adhesion; and (c) separating the resulting fine particles free from electrostatic adhesion from the synthetic resin pellets.

2. The method of claim 1 wherein step (c) comprises conveying the particles free from electrostatic adhesion with a gas to separate the fine particles from the synthetic resin pellets.

3. The method of claim 1 wherein the synthetic resin pellets have a short dimension of 1 to 3 mm and a long dimension of 1 to 8 mm, and the fine particles pass through a screen having 16 mesh size according to JIS standard.

4. The method of claim 1 wherein in the particle mixture of synthetic resin pellets containing fine particles the content of the fine particles is 100 to 500 ppm by weight.

5. The method of claim 1 wherein step (b) comprises contacting the particle mixture of the synthetic resin pellets containing the fine particles with a countercurrently upwardly flowing mixture of a non-ionized gas with said ionized gas and wherein step (c) comprises conveying the resulting fine particles which have been separated from the synthetic resin pellets with the upwardly flowing gas mixture to thereby separate the resulting fine particles from the synthetic resin pellets.

6. The method of claim 5 which further comprises causing the particle to flow against the upwardly countercurrently flowing gas mixture and to collide against barrier members in the path of travel of the particle mixture such that the fine particles from which the adhesion has been eliminated are separated from the synthetic resin pellets as a result of such collisions.

7. A method for removing fine particles electrostatically adhering to a synthetic resin pellet from a particle mixture of synthetic resin pellets containing fine particles which comprises:

(a') subjecting a gas to an ionizing treatment to obtain an ionized gas;

(b') causing the mixture of synthetic resin pellets containing the fine particles to flow downwardly into countercurrent contact with an upwardly flowing gas mixture containing a mixture of non-ionized gas and said ionized gas to thereby eliminate the electrostatic adhesion between the synthetic resin pellets and fine particles; and (c') conveying the resulting fine particles free from electrostatic adhesion with the gas mixture such that the fine particles free from electrostatic adhesion are separated from the downwardly flowing synthetic resin pellets.

8. The method of claim 7 wherein step (b') comprises causing the downwardly flowing particle mixture of synthetic resin pellets and fine particles free from electrostatic adhesion to collide against barrier members thereby separating the fine particles from the synthetic resin pellets.

9. The method of claim 7 wherein the synthetic resin pellets have a short dimension of 1 to 3 mm and a long dimension of 1 to 8 mm, and the fine particles pass through a screen having 16 mesh size according to JIS standard.

10. The method of claim 7 wherein the particle mixture of synthetic resin pellets and fine particles has a fine particle content of 100 to 500 ppm by weight.

11. An apparatus for removing fine particles from a particle mixture of synthetic resin pellets containing the fine particles electrostatically adhered thereto, said apparatus comprising:

(a) a conduit-like structure providing a synthetic resin falling path which is bent in at least one position, ($b_1$) a feed inlet for feeding said mixture to an upper portion of the synthetic resin falling path;

($b_2$) a gas exhaust port situated in the vicinity of said feed inlet;

($c_1$) a discharge outlet for discharging the synthetic resin pellets from a lower portion of the synthetic resin falling path;

($c_2$) a port for blowing a non-ionized gas, said port being situated in the vicinity of said discharge outlet; and (d) a plurality of openings for blowing ionized gas, wherein each of said openings in said plurality of openings is connected to a source of ionized gas whereby ionized gas may be introduced into the conduit-like structure along the length of the synthetic resin falling path.

12. A system for storing and treating synthetic resin pellets, comprising:

(a) a bunker for accumulating a particle mixture of synthetic resin pellets containing fine particles, at least some of the fine particles being firmly electrostatically adhered to the pellets and at least some of the fine particles being less firmly associated with the pellets, said bunker having an outlet at the lower end thereof;

(b) first removal apparatus for removing said less firmly associated fine particles from said mixture; said first removal apparatus having a particle inlet for receiving the particle mixture from said bunker, means for separating the less firmly associated fine particles from said mixture, and a discharge outlet for removing the particle mixture from which the less firmly associated fine particles have been removed;

(c) second removal apparatus for removing said firmly electrostatically adhered fine particles from said particle mixture received from said first removal apparatus, said second removal apparatus comprising the apparatus of claim 11;

(d) collection apparatus for collecting fine particles removed from said particle mixture by said first and second removal apparatus;

(e) source of pressurized gas;

(f) a first pipe connecting the outlet of the bunker to the particle inlet of the first removal apparatus for conveying the particle mixture from the bunker to the first removal apparatus via said source of pressurized gas;

(g) a second pipe for conveying the particle mixture from the outlet of the first removal apparatus to the feed inlet of the second removal apparatus;

(h) a system outlet for removing the synthetic resin pellets substantially free of fine particles from the system;

(i) a third pipe connecting the discharge outlet at the lower portion of the second removal apparatus to the system outlet for conveying, via said source of pressurized gas, the synthetic resin pellets from the discharge outlet of the second removal apparatus to the system outlet; and, (j) a fourth pipe for conveying fine particles removed from the particle mixture in the first and second removal apparatus to the collection apparatus.

13. An apparatus for removing fine particles from a particle mixture of synthetic resin pellets containing the fine particles electrostatically adhered thereto, said apparatus comprising a tower having ($a'_1$) a feed inlet for feeding the mixture, said inlet being situated in an upper portion of the tower, ($a'_2$) a gas exhaust port situated in the vicinity of the inlet;

($b'_1$) a discharge outlet for discharging synthetic resin pellets, said outlet being situated in a lower portion of the tower;

($b'_2$) a port for blowing non-ionized gas, said port being situated in the vicinity of the discharge outlet;

(c') at least two baffles mounted within the tower and forming a bent flow path for the synthetic resin pellets; and (d') a plurality of openings for blowing an ionized gas, each of said openings inside said plurality of openings being connected to a source of ionized gas and said openings being situated along the length of the tower for blowing the ionized gas in the direction towards the falling flow path of synthetic resin pellets falling through said bent flow path.

14. A system for storing and treating synthetic resin pellets, comprising:

(a) a bunker for accumulating a particle mixture of synthetic resin pellets containing fine particles, at least some of the fine particles being firmly electrostatically adhered to the pellets and at least some of the fine particles being less firmly associated with the pellets, said bunker having an outlet at the lower end thereof;

(b) first removal apparatus for removing said less firmly associated fine particles from said mixture; said first removal apparatus having a particle inlet for receiving the particle mixture from said bunker, means for separating the less firmly associated fine particles from said mixture, and a discharge outlet for removing the particle mixture from which the less firmly associated fine particles have been removed;

(c) second removal apparatus for removing said firmly electrostatically adhered fine particles from said particle mixture received from said first removal apparatus, said second removal apparatus comprising the apparatus of claim 13;

(d) collection apparatus for collecting fine particles removed from said particle mixture by said first and second removal apparatus;

(e) source of pressurized gas;

(f) a first pipe connecting the outlet of the bunker to the particle inlet of the first removal apparatus for conveying the particle mixture from the bunker to the first removal apparatus via said source of pressurized gas;

(g) a second pipe for conveying the particle mixture from the outlet of the first removal apparatus to the feed inlet of the second removal apparatus;

(h) a system outlet for removing the synthetic resin pellets substantially free of fine particles from the system;

(i) a third pipe connecting the discharge outlet at the lower portion of the second removal apparatus to the system outlet for conveying, via said source of pressurized gas, the synthetic resin pellets from the discharge outlet of the second removal apparatus to the system outlet; and, (j) a fourth pipe for conveying fine particles removed from the particle mixture in the first and second removal apparatus to the collection apparatus.

* * * * *